United States Patent
Parks

Patent Number: 5,251,948
Date of Patent: Oct. 12, 1993

[54] REPLACEMENT WINDSHIELD FOR SNOWMOBILE

[76] Inventor: Michael F. Parks, Rte. 1, Box 203A, Dresser, Wis. 54009

[21] Appl. No.: 977,617

[22] Filed: Nov. 17, 1992

[51] Int. Cl.$^5$ ............................................. B60J 1/02
[52] U.S. Cl. .............................. 296/96.12; 296/96.14; 180/190
[58] Field of Search ................... 296/77.1, 78.1, 84.1, 296/90, 91, 96.12, 96.14, 70, 72; 180/190

[56] References Cited

U.S. PATENT DOCUMENTS

| | | | |
|---|---|---|---|
| 3,622,196 | 11/1971 | Sarra | 296/90 |
| 3,637,254 | 1/1972 | Lapointe et al. | 296/90 X |
| 3,819,226 | 6/1974 | Sykora | 296/90 |
| 3,923,338 | 12/1975 | Sovia et al. | 296/84.1 |
| 3,997,212 | 12/1976 | Tesch | 296/90 X |
| 4,082,346 | 4/1978 | Perreault et al. | 296/84.1 |

FOREIGN PATENT DOCUMENTS 39829 3/1990 Japan ...................... 296/77.1

Primary Examiner—Joseph D. Pape
Attorney, Agent, or Firm—Palmatier, Sjoquist & Helget

[57] ABSTRACT

A replacement windshield for a snowmobile, including a front face which flushly engages the headlight housing and hood of a snowmobile. A rear face flushly engages the dashboard and hood of the snowmobile opposite the front face. The invention prevents the accumulation of snow and/or ice proximal to the dashboard during use. The invention is durable and sturdy protecting the dashboard area of a snowmobile from damage during rollover accidents. The aerodynamics of the front face, in conjunction with the first and second lips, deflect air, snow, and ice up and away from drivers and passengers of snowmobiles.

19 Claims, 1 Drawing Sheet

REPLACEMENT WINDSHIELD FOR SNOWMOBILE

BACKGROUND OF THE INVENTION

In the past, plexiglass windshields/windscreens have been used with snowmobiles in order to deflect cold air, ice, and snow from an operator. These windshields, as known, were generally vertical and did not enclose the area of the snowmobile surrounding the dashboard. The area adjacent the dashboard, behind the windshield, frequently accumulated undesired ice and snow due to aerodynamic and wind conditions.

Accumulation of ice/snow proximal to the dashboard area of a snowmobile is undesirable to operators. Moisture proximal to a dashboard may damage the electronics of a snowmobile and reduce the safety of drivers and passengers. Airborne snow/ice frequently strike a driver during operation of a snowmobile.

Plexiglass windshields are not sturdy. Plexiglass windshields are easily fractured, reducing the usefulness of a snowmobile to the operator. Plexiglass windshields, as known, do not provide any protection to the dashboard during rollover situations. In the past, dashboards have been frequently damaged during rollover situations. A windshield providing protection to the dashboard and operator significantly improves the utility of a snowmobile.

SUMMARY OF THE INVENTION

The invention relates to a replacement windshield for a snowmobile. The invention includes a front face which flushly engages the headlight housing and hood of a snowmobile. A rear face flushly engages the dashboard and hood of the snowmobile opposite the front face. The invention prevents the accumulation of snow and/or ice proximal to the dashboard during use. The invention is durable and sturdy to protect the dashboard area of a snowmobile from damage during rollover accidents. The aerodynamics of the front face, in conjunction with forwardly curved first and second lips, deflect air, snow, and ice up and away from drivers and passengers of snowmobiles.

It is a principal object of the present invention to provide a new and improved replacement windshield for a snowmobile of relatively simple and inexpensive design, construction, and operation, which is convenient in size, safe, and durable for use with a snowmobile without fear of damage to the snowmobile or injury to persons.

Another object of the invention is to prevent accumulation of snow and/or ice behind a windshield and proximal to the dashboard area of the snowmobile.

Still another object of the invention is to protect the dashboard and instruments of the snowmobile from moisture damage.

Still another object of the invention is to protect the dashboard and instruments of a snowmobile from damage during rollover accidents.

Still another object of the present invention is to provide a windshield of aerodynamic design which deflects cold air, snow, and/or ice away from of a snowmobile during use, which increases the comfort, visibility and safety of drivers and passengers.

Still another object of the invention is to improve the aesthetic appearance of a snowmobile.

A feature of the present invention is a front face flushly engaged to the headlight housing and hood of a snowmobile.

Another feature of the invention is a first and second lip for aerodynamic deflection of cold air, snow, and/or ice away from an operator of a snowmobile during use.

Still another feature of the invention is a pair of substantially triangular exterior opposite sides for the aerodynamic deflection of cold air, snow, and/or ice away from an operator and dashboard of a snowmobile during use.

Still another feature of the invention is a rear face flushly engaged to a pair of interior opposite sides and dashboard of a snowmobile preventing accumulation of ice and/or snow proximal to the dashboard.

DETAILED DESCRIPTION OF THE PREFERRED EMBODIMENT

Figure 1:
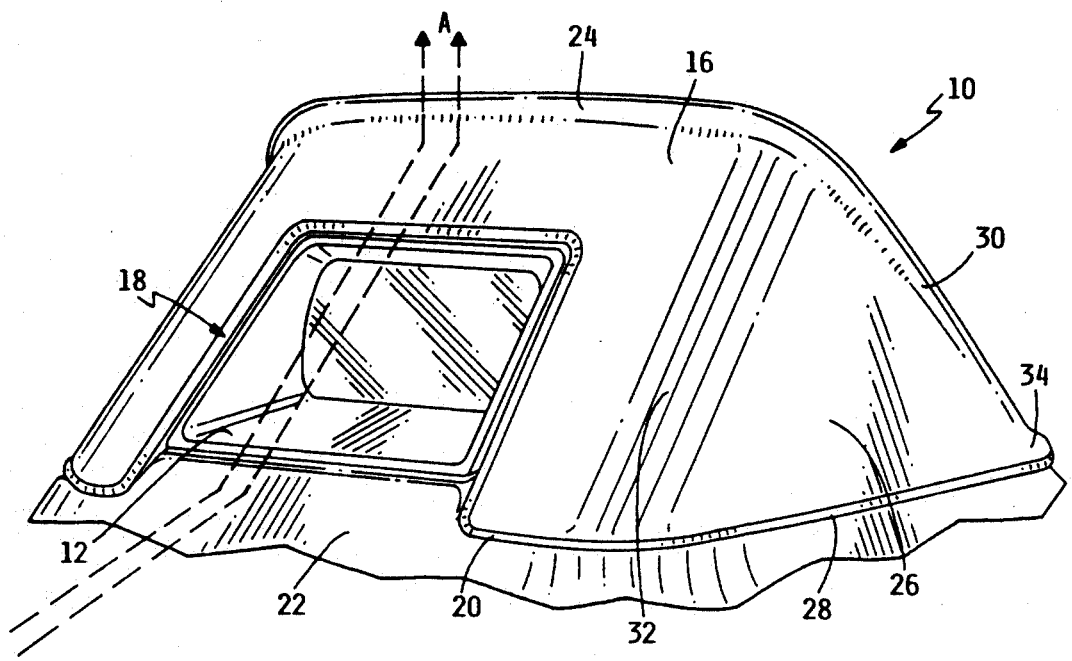
FIG. 1 is a front isometric view of the invention engaged to the hood and headlight housing of a snowmobile.

One form of the invention is illustrated and described herein. The snowmobile windshield is indicated in general by the numeral 10. The head lamp housing of a snowmobile is indicated by the numeral 12. The dashboard of a snowmobile is indicated by the number 14.

The snowmobile windshield 10 is preferably formed or molded of one-piece construction of resilient durable plastic, fiberglass, ABS plastic material and/or Metton TM liquid molding resin material as commercialized by Hercules Engineered Polymers Company or Hercules, Inc. of Wilmington, Del. The snowmobile windshield 10 is of sufficient strength to not fracture upon impact with rocks and/or ice. The snowmobile windshield 10 is also preferably of sufficient strength to not fracture or break during rollover accidents, thereby protecting a dashboard 14 from damage during these situations. The snowmobile windshield 10 contains a front face 16, a recessed headlight section 18, and a first or leading edge 20.

Front face 16 generally begins forward of the headlight housing 12 proximal to the hood 22 of a snowmobile. The front face 16 is preferably flat and generally extends angularly rearward and upward terminating at a first lip 24 located substantially proximal to and above the dashboard 14.

A recessed headlight section 18 is centrally located in the front face 16. The recessed headlight section 18 centrally initiates at the first or leading edge 20 and extends angularly rearward and upward for flush surrounding engagement of the head lamp housing 12 of a snowmobile. Preferably the recessed headlight section 18 is substantially rectangular. The recessed headlight section 18 may be oval and/or round at the preference of an operator dependent upon the manufacturer and/or model of the snowmobile.

The first or leading edge 20 is preferably coated with silicon, rubber, or silicon-rubber at the preference of an operator. The coating material affixed to the first or leading edge 20 is preferably pliable and durable which is able to withstand extreme temperature variations without cracking or fracturing. The coating affixed to the first or leading edge 20 preferably prevents scratching of the hood 22 of the snowmobile. Friction between the leading edge 20 and the hood 22 may occur during operation and use of the windshield 10 with a snowmobile. Preferably the coating of the leading edge 20 minimizes, if not eliminates, friction between the windshield 10 and the hood 22 during use of a snowmobile.

The first or leading edge 20 is in flush and continuous contact with the hood 22 and/or headlight housing 12 of a snowmobile over the entire front face 16. The flush and continuous engagement between the first or leading edge 20 and the hood 22 and/or headlight housing 12 preferably prevents the penetration of snow and/or ice under the windshield 10 during operation and use. The flush continuous engagement of the first or leading edge 20 to the hood 22 promotes the aerodynamic efficiency of the windshield 10 by minimizing, if not eliminating, the passage of air under the windshield 10.

During operation and use of the windshield 10, an air flow course "A" is created, where air initially passes over the hood 22 for initial upward deflection by the front face 16 for vertical engagement to the first lip 24.

The first lip 24 is located above the front face 16 traversing the entire front width of the windshield 10. The first lip 24 extends substantially vertically upward from the front face 16. The transition between the front face 16 and the first lip 24 is preferably a smooth concave curve. The transition may be angular along a line traversing the front face 16 at the discretion of an operator. The width of the first lip 24 is preferably three quarters inch; however, the width of the first lip may 24 be longer at the discretion of an operator. The illustrated dimensions are provided to indicate one form of the invention which may be suitably varied according to the desired operational conditions, specifications or preferences of an operator.

The substantially vertical first lip 24 in conjunction with the angularly extending rearward and upward front face 16 directs the air flow course "A" substantially vertically over a snowmobile during use. Cold air, ice, and/or snow are preferably directed over the top of the heads of a driver or passenger during operation of a snowmobile. The comfort to a driver and/or passenger is thereby significantly improved.

A pair of exterior opposite sides 26 depend rearwardly from the front face 16. Each exterior opposite side 26 has a second edge 28 and a second lip 30. Each exterior opposite side 26 is generally flat and triangular in shape depending rearward from the rounded front corner 32 which serves as a transition between the front face 16 and the exterior opposite side 26. Each exterior opposite side 26 extends substantially vertically perpendicular to the hood 22. The exterior opposite sides 26 also depend substantially perpendicular from the front face 16.

The second edge 28 of each of the pair of exterior opposite sides 26 initiates at the first or leading edge 20 of the front face 16. The second edge 28 then depends rearward following the contour of the hood 22 terminating at a first corner section 34. The second edge 28, like the first or leading edge 20, is coated with silicon, silicon-rubber, or rubber as earlier described.

Figure 2:
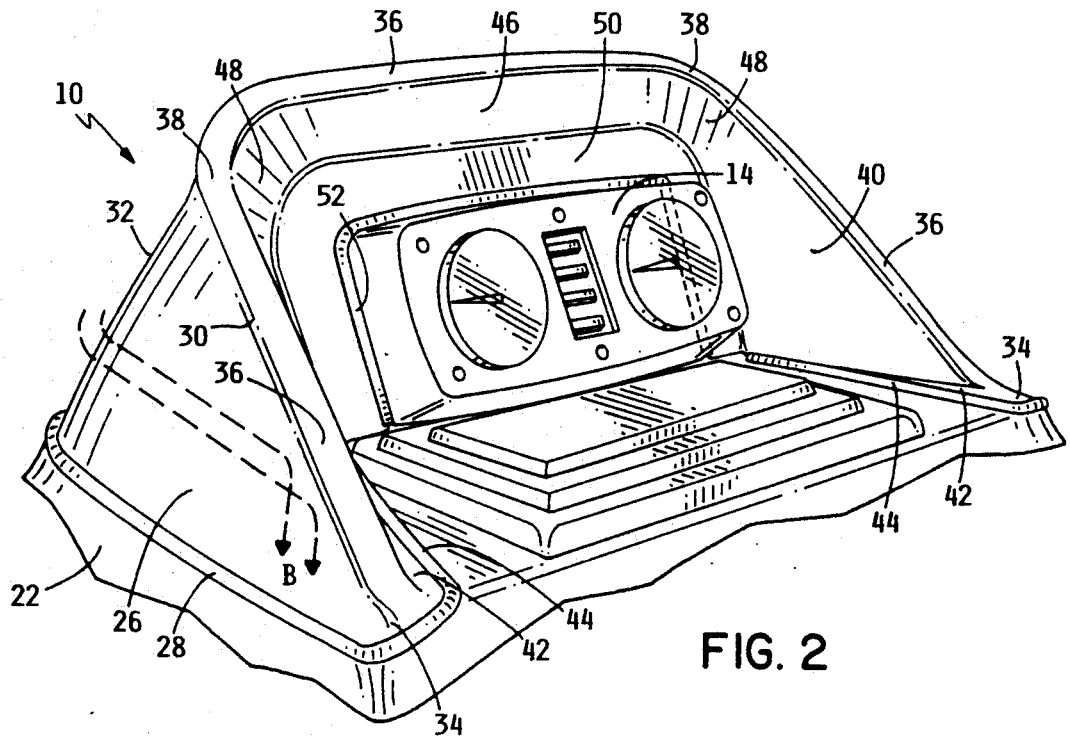
FIG. 2 is a rear isometric view of the invention engaged to the hood and dashboard area of a snowmobile.

The second edge 28 flushly and continuously contacts the hood 22 between the first or leading edge 20 and the first corner sections 34. The first corner sections 34 of each of the pair of exterior opposite sides 26 is positioned in flush contact with the hood 22 rearward of the dashboard 14 and proximal to the driver of a snowmobile. (FIG. 2)

The second lip 30 is located above each of the pair of exterior opposite sides 26. The second lip 30 descends angularly rearward and downward from the first lip 24 following the upper contour of the pair of exterior opposite sides 26. The second lip 30 initiates at the first lip 24 of the front face 16 and terminates at the first corner sections 34 of the pair of exterior opposite sides 26. The transition between the pair of exterior opposite sides 26 and the second lip 30 is preferably a smooth concave curve; however, the transition may be angular along a descending line following the upper contour of the pair of exterior opposite sides 26 at the discretion of an operator. The width of the second lip 30 is preferably ¾ inches similar to the first lip 24. The width of the second lip 30 may also vary at the discretion of the operator. The second lip 30 preferably diverges vertically upward and outward from the pair of exterior opposite sides 26.

The substantially vertical triangular pair of exterior opposite sides 26, having the outwardly diverging second lips 30, direct an air flow course B laterally past a snowmobile during use. Cold air, ice, and/or snow are preferably diverted outward and away from a driver or passenger during operation of a snowmobile. Improved comfort and utility of a snowmobile is thereby provided to individuals. The flush and continuous engagement between the second edge 28 and the hood 22 preferably prevents the penetration of snow and/or ice under the windshield 10 during operation and use. The flush continuous engagement of the second edge 28 to the hood 22 promotes the aerodynamic efficiency of the windshield 10 by minimizing, if not eliminating, the passage of air under the windshield 10.

An upper ridge 36 preferably joins and follows the contour of the first lip 24 of the front face 16 and the second lips 30 of the exterior opposite sides 26. The upper ridge 36 is generally flat. The upper ridge 36 is generally perpendicular to the pair of exterior opposite sides 26 extending horizontally inward therefrom. The upper ridge 36 is also generally perpendicular to the first lip 24 extending angularly downward and rearward therefrom. The upper ridge 36 joins the first corner sections 34. The transition between the upper ridge 36 and the first corner sections 34 is preferably a smooth concave curve; however, this transition may be of angular or convex shape at the discretion of an operator. The upper ridge 36 has rounded junctions 38 which serve as the transition areas between the portions of the upper ridge 36 proximal to the pair of second lips 30 and the portion of the upper ridge 36 proximal to the first lip 24.

A pair of interior opposite sides 40 extend angularly forward and inward from the upper ridge 36 proximal to the second lips 30. The pair of interior opposite sides 40 are generally flat and triangular in shape. A pair of interior opposite sides 40 terminate proximal to the dashboard 14 of a snowmobile. The pair of interior opposite sides 40 are generally vertical and extend upward perpendicular from the hood 22 of the snowmobile. Each of the interior opposite sides 40 is separated from the corresponding exterior opposite side 26.

Each interior opposite side 40 has an interior lip portion 42 and a third edge 44. Each interior lip portion 42 is engaged to the adjacent first corner section 34 and the interior opposite side 40. Each interior lip portion 42 extends horizontally inward and forward from the first corner section 34 terminating proximal or adjacent to the rear surface 50. Each interior lip portion 42 is generally flat and triangular in shape substantially perpendicular to the interior opposite side 40, and is positioned proximal to the hood 22 of a snowmobile.

The third edge 44 of each of the interior opposite sides 40 and lips 42 initiate at the first corner sections 34. The third edges 44 depend angularly forward and inward from the first corner sections 34 toward the front face 16, following the contour of the interior lip portions 42 and the hood 22 of the snowmobile. The third edges 44 terminate proximal to the dashboard 14. The third edges 44, like the first or leading edge 20 and the second edges 28, are coated with the same silicon, silicon-rubber, or rubber material as earlier described. The third edges 44 are flushly and continuously in contact with the hood 22 between the first corner sections 34 and the dashboard 14.

The substantially vertical triangular pair of interior opposite sides 40 having the interior lip portions 42 provide support to the pair of exterior opposite sides 26 during operation of a snowmobile. The pair of interior opposite sides 40 assist in maintaining the air flow courses "A" and "B", either outwardly away from the exterior of the windshield 10, or over the top of the areas occupied by travelers, improving the comfort and utility of snowmobiles to individuals.

Flush and continuous engagement between the third edges 44 and the hood 22 preferably prevent the penetration of snow and/or ice under the windshield 10 during operation and use. The flush continuous engagement of the third edges 44 to the hood 22 promotes the aerodynamic efficiency of the windshield 10 by minimizing, if not eliminating, the passage of air under the windshield 10.

The interior top portion 46 depends inward and forward from the upper ridge 36 proximal to the first lip 24. The interior top portion 46 which depends from the upper ridge 36 is separated from the front fact 16. The interior top portion 46 joins each of the interior opposite sides 40 at the curved transition portions 48 which are located proximal to the rounded junctions 38 of the upper ridge 36. Preferably the curved transition portions 48 are of a smooth concave curved shape; however, the curved transition portions 48 may be angular or convex shaped at the discretion of an operator.

The rear face 50 depends vertically downward from the interior top portion 46. The rear face 50 is inclined rearwardly from the interior top portion 46. The rear face 50 also extends horizontally inward from the interior opposite sides 40. The rear face 50 is generally flat having a fourth edge 52. The rear face 50 is generally in the same plane as the front of the dashboard 14.

The fourth edge 52 initiates at a third edge 44 of one of the pair of interior opposite sides 40, extending horizontally inward therefrom. Fourth edge 52 then extends vertically upward, substantially perpendicular to the portion of the fourth edge 52 proximal to the third edge 44. The fourth edge 52 then extends horizontally inward toward the opposite interior opposite side 40 over the dashboard 14. The fourth edge 52 then depends vertically downward to a position proximal to the opposite third edge 44. The fourth edge 52 then extends horizontally outward for joinder to the third edge 44 of the opposite interior side 40. The fourth edge 52 has the same incline as the rear face 50. The fourth edge 52 preferably defines a rectangular area adapted for receiving engagement of a dashboard 14 of a snowmobile. The area defined by the fourth edge 52 may suitably be oval, round, square, or any preferred shape at the discretion of an operator for receiving engagement of a particular make of manufacturer of a dashboard 14 of a snowmobile. Preferably the fourth edge 52 is coated with the same silicon, silicon-rubber, or rubber material as the first, second, or third edges 20, 28, and 44, respectively, as earlier described.

Preferably the fourth edge 52 flushly and completely engages the circumference of the exterior of the dashboard 14. The rear face 50 in conjunction with the pair of interior opposite sides 40 and the interior top portion 46 completely encloses the dashboard area and hood 22 of the snowmobile preventing accumulation of ice or snow behind the front face 16 and proximal to the dashboard 14. Accumulation of ice and/or snow behind a windshield is thereby prevented.

The windshield 10 may be affixed to a snowmobile by the use of snaps, plastic body screws, or fasteners as known in the art. Preferably the windshield 10 will be affixed to a snowmobile by the engagement of the first corner sections 34 and/or the interior lip portions 42 to the hood 22. The windshield 10, when engaged to a snowmobile, provides improved durability over the known art. Following attachment of the windshield 10 to the hood 22 an individual will preferably be able to grasp the windshield 10 and rock the entire snowmobile, via the suspension, without fear of fracture or separation of the windshield from the hood 22. The strength of the windshield 10 as compared to the plexiglass windshields as known, is thereby significantly improved. The strength and durability of the windshield protects the instrumentation, dashboard 14, handlebars, drivers and passengers of a snowmobile during rollover situations.

The windshield 10 may be artistically colored to match the pin striping, markings, and/or color of a snowmobile at the discretion of an individual. The aesthetic appearance of a snowmobile may therefore be significantly improved.

The present invention may be embodied in other specific forms without departing from the spirit or essential attributes thereof, and it is therefore desired that the present embodiment be considered in all respects as illustrative and not restrictive, reference being made to the appended claims rather than to the foregoing description to indicate the scope of the invention.

What is claimed:

1. A replacement windshield device for a snowmobile having a hood, headlight housing, and dashboard, said windshield device comprising:
    (a) a front face having a leading edge, a head lamp section, and a first lip portion;
    (b) a pair of opposite exterior sides engaged to said front face, each of said opposite exterior sides having a second edge, first corner section, and second lip portion;
    (c) an upper ridge engaged to said first and second lip portions and said first corner sections;
    (d) a pair of interior opposite sides engaged to said upper ridge, each of said interior opposite sides having an interior lip portion engaged to said first corner sections, each of said interior opposite sides further having a third edge where each of said interior opposite sides is separated from said pair of opposite exterior sides;
    (e) an interior top portion engaged to said upper ridge, said interior top portion depending from said upper ridge and separated from said front face, said interior top portion further engaged to said pair of interior opposite sides; and (f) a rear face depending from said interior top portion, said rear face further engaged to said pair of interior opposite sides, said rear face having a fourth edge connected to each of said third edges of said pair of interior opposite sides, said fourth edge engaged to said dashboard of said snowmobile.

2. The device according to claim 1 wherein aid front face is flat extending angularly rearward and upward from said leading edge terminating at said first lip portion.

3. The device according to claim 2 wherein said head lamp section is rectangular and is flushly engaged to said headlight housing of said snowmobile.

4. The device according to claim 3 wherein said leading edge is coated with a material selected from the group consisting of silicon, rubber, and silicon-rubber, said leading edge being flushly engaged to said hood of said snowmobile.

5. The device according to claim 4 wherein said first lip portion extends vertically upward from said front face.

6. The device according to claim 5, wherein said pair of exterior opposite sides are flat and triangular in shape depending rearward from said front face, said pair of exterior opposite sides further having rounded front corners engaged to said front face, said pair of exterior opposite sides further extending vertically upward perpendicular from said hood of said snowmobile.

7. The device according to claim 6, wherein said second edge is coated with a material selected from the group consisting of silicon, rubber, and silicon-rubber, said second edge being flushly engaged to said hood of said snowmobile.

8. The device according to claim 7, wherein said second lip portions extend vertically upward and diverge outwardly from said pair of opposite exterior sides.

9. The device according to claim 8, wherein said first corner sections are positioned rearward of said dashboard of said snowmobile in flush contact with said hood of said snowmobile.

10. The device according to claim 9, wherein said upper ridge is flat initiating at one of said first corner sections, depending upward along said second lip portion, extending horizontally along said first lip portion, further depending downward along said opposite second lip portion terminating at said opposite first corner section.

11. The device according to claim 10 wherein said upper ridge has rounded junctions proximal to said first and second lip portions.

12. The device according to claim 11, wherein said pair of interior opposite sides depend forward and inward from said upper ridge.

13. The device according to claim 12, wherein said interior lip portions depend horizontally inward and forward from said first corner sections terminating proximal to said rear face.

14. The device according to claim 13, wherein said third edge is coated with a material selected from the group consisting of silicon, rubber, and silicon-rubber, said third edge being flushly engaged to said hood of said snowmobile proximal to said dashboard.

15. The device according to claim 14, wherein said interior top portion depends initially downward from said upper ridge.

16. The device according to claim 15, wherein said interior top portion joins said pair of interior opposite sides proximal to said rounded junctions defining a pair of curved transition portions.

17. The device according to claim 16, wherein said rear face depends vertically and inclined rearwardly from said interior top portion, said rear face further extending horizontally inward from said pair of interior opposite sides.

18. The device according to claim 17, wherein said fourth edge initiates at one of said third edges extending horizontally inward therefrom, said fourth edge then extending vertically inclined forwardly upward to a point proximal to one of said curved transitions, said fourth edge then extending horizontally to a location proximal to said opposite curved transition, said fourth edge then depending vertically inclined rearwardly downward to a position proximal to said opposite third edge, said fourth edge then extending horizontally outward terminating at said opposite third edge.

19. The device according to claim 18, wherein said fourth edge is coated with a material selected from the group consisting of silicon, rubber, and silicon-rubber.

* * * * *

UNITED STATES PATENT AND TRADEMARK OFFICE
CERTIFICATE OF CORRECTION

PATENT NO. : 5,251,948
DATED : October 12, 1993
INVENTOR(S) : Michael F. Parks

It is certified that error appears in the above-identified patent and that said Letters Patent is hereby corrected as shown below:

Column 7, line 8, delete "aid" and insert --said--.

Signed and Sealed this

Twenty-second Day of March, 1994

Attest:

BRUCE LEHMAN

Attesting Officer     Commissioner of Patents and Trademarks